United States Patent [19]

Salo

[11] 4,117,054
[45] Sep. 26, 1978

[54] METHOD OF COMPENSATING FOR THE ROLL DEFLECTION IN A CALENDER

[75] Inventor: Esko Salo, Jakobstad, Finland

[73] Assignee: Oy Wiik & Höglund Ab, Finland

[21] Appl. No.: 780,425

[22] Filed: Mar. 23, 1977

[30] Foreign Application Priority Data

Mar. 30, 1976 [FI] Finland .................................. 760841

[51] Int. Cl.² .......................... B29C 15/00; B29D 9/02; B29D 7/14
[52] U.S. Cl. ..................................... 264/40.1; 72/248; 100/35; 100/47; 100/168; 264/40.5; 264/175; 425/172; 425/363; 425/367
[58] Field of Search ..................... 264/40.1, 40.5, 175; 425/172, 363, 367; 100/35, 47, 168; 72/248

[56] References Cited

U.S. PATENT DOCUMENTS

| | | | |
|---|---|---|---|
| 1,989,038 | 1/1935 | Brown | 425/367 |
| 2,424,856 | 7/1947 | Schnuck | 425/367 |
| 3,060,843 | 10/1962 | Moore et al. | 425/363 |
| 3,084,314 | 4/1963 | Ziffer | 425/367 |
| 3,264,682 | 8/1966 | Freeman | 264/175 |
| 3,273,199 | 9/1966 | Kleinewefers | 425/367 |
| 3,274,308 | 9/1966 | Freeman et al. | 425/367 |
| 3,499,957 | 3/1970 | Ancker | 425/367 |
| 3,527,638 | 9/1970 | Sonnichsen | 425/367 |
| 3,599,288 | 8/1971 | Eakman | 425/172 |
| 3,936,258 | 2/1976 | Lake | 425/367 |
| 4,014,636 | 3/1977 | Pawelczyk | 425/367 |
| 4,038,012 | 7/1977 | Sander | 425/367 |

*Primary Examiner*—W.E. Hoag
*Attorney, Agent, or Firm*—McGlew and Tuttle

[57] ABSTRACT

The method maintains a set nip clearance at a uniform value across the widths of the calendar, at different calendar loads, in at least the last nip, in the working direction, of a calender stack or the like including at least three rolls subjected to a common work-press load, with at least one roll being crowned to correspond to the maximum load of the calendar and at least one roll being adjustable. The thickness of the material being treated is sensed at one or several points in a direction transverse to the material web, or the deflection, or the load, is sensed at one or several of the rolls. The position of one or more adjustable rolls is displaced, relative to the common plane through the roll axes, in accordance with the sensing in a manner such that the axis of the adjustable roll or rolls remains parallel to the adjacent roll axis. The adjustable rolls may be displaced horizontally either linearly or arcuately to follow the contour of the adjacent rolls. The adjustment may be effected automatically responsive to measurements and to calculations performed by a computer.

10 Claims, 6 Drawing Figures

METHOD OF COMPENSATING FOR THE ROLL DEFLECTION IN A CALENDER

The present invention concerns primarily a method of obtaining a substantially even profile along the whole roll width irrespective of the roll deflection at least in the last nip of a calender stack in the direction of movement of the web, and thus an even material thickness along the whole web width.

BACKGROUND OF THE INVENTION

A major problem of the calenders used, e.g. in the plastic industry for the manufacture of thin plastic foils or films, has been the deflection of the rolls, especially the long rolls, which deflection varies at adjacent rolls and thus gives rise to variations in the roll nip in a direction transverse to the roll assembly. This naturally also gives rise to irregularities and variations in the foil profile in a direction transverse to the manufactured web, above all variations in the thickness. The negative effect of the uneven profile is especially apparent in thin plastic webs. An uneven foil is also difficult to use.

Different means have been used in an attempt to eliminate the above mentioned disadvantages caused by the roll deflection. Attempts have been made i.a. to bend the roll in the opposite direction to counteract the deflection. This is achieved by applying a load on the roll axis at both ends outside the bearing points, which load opposes the pressing force. In this way it is possible to compensate for the deflection of the adjacent roll to some degree, but not entirely, and this results in an oxbow profile of the mmaterial to be treated.

Another method of compensating consists in inclining the roll axis in relation to the adjacent roll axes, but also in this case the result is similar, that is an oxbow profile is obtained.

The most advantageous method of compensating for the roll deflection consists in crowning the rolls in accordance with the roll deflection. In this way a constant nip width is obtained, but only if all the factors on which the desired crowning is based, i.e. the working speed of the calender, the composition of the material and the temperature and material thickness etc., remain unchanged. If one of these factors is changed, also the crowning of the roll should be corrected. This is, however, very difficult to carry out in practice.

It is also known to adjust the roll thickness at certain areas along the rolls by alternatively heating or cooling the areas in question, as required.

Finally also so called "non-bending" rolls exist which are very expensive, but not even the characteristics of these rolls are sufficient to cover completely all existing fields of application.

SUMMARY OF THE INVENTION

The object of the invention is to provide a practically applicable method of compensating for such variations, in the thickness along the width of the material web, which are caused by the roll deflection, when the load conditions in the calender change, and tests have shown that a constant nip width may be achieved at least in the last nip in the direction of web movement, which is of extreme importance as this nip imparts the web with its final thickness profile.

In an ordinary calender or a roll assembly the rolls are usually arranged one on top of the other, or at least in such a way that the axis ends normally are aligned, except the above mentioned inclination of one of the rolls. The pressing load on the rolls and also the load exerted by the weight of the roll are oriented along this straight line defined by the axes ends. The invention resides in the discovery that the irregularities in the nip caused by the roll deflection first are eliminated by crowning at least one of the rolls to correspond to certain predetermined calender conditions which give a maximum working load, and that the variations in the roll deflection caused by changes in the varying factors which decrease the load in the calender thereafter are eliminated by allowing controlled deflection of an adjustable roll or rolls so that a constant nip width value along the whole nip length is achieved. This is achieved by resolving the pressing and weight loads acting on the adjustable roll or rolls into components by displacing the roll or rolls, whereby the force component acting on the nip may be adjusted to a constant value whose magnitude is so exact as to give a constant width along the whole nip length. As a result of the displacement, the adjustment roll is deflected and thus the excess crowning eliminated.

The characteristic features of the invention appear from the appended claims.

The adjusting of the calender may be carried out manually but the invention method has proved especially advantageous in connection with automatic calender adjustment whereby the profile of the web treated or to be treated is sensed at the center of the web and at its border or borders during the calendering operation. In case the thickness at the borders differs from the thickness at the center, the position of the adjustable roll or rolls, respectively, is changed so as to eliminate the differences in the thickness. This adjustment is advantageously carried out by means of e.g. a computer, which has been programmed according to an operational scheme based on mathematical calculations, and which gives an instruction to the displacing means of the roll or rolls, respectively, to effect a parallel displacement of the roll or rolls in accordance with the measuring results obtained. Another possibility of informing, e.g. a computer for the purpose of adjusting the roll position, consists in sensing the surface of the adjustable roll or rolls, respectively, at the center and at the ends, i.e. to measure the magnitude of deflection, and to transfer the result to a computer to calculate the magnitude of the displacement required. The adjusting impulse may also be received from means measuring the roll pressure.

The adjustable roll or rolls may be displaced either linearly or along an arcuate line following the outer surface of the adjacent roll, but the displacement should always take place in such a way that the roll axes remain mutually parallel. When the adjustable roll is displaced from its original position further away from the line connecting the center line of the adjacent roll axes, these two latter rolls move towards each other a distance corresponding to the space left free by the outwardly displaced roll. For an understanding of the principles of the invention, reference is made to the following description of typical embodiments thereof as illustrated in the accompanying drawings.

DESCRIPTION OF THE PREFERRED EMBODIMENTS

Figure 1:
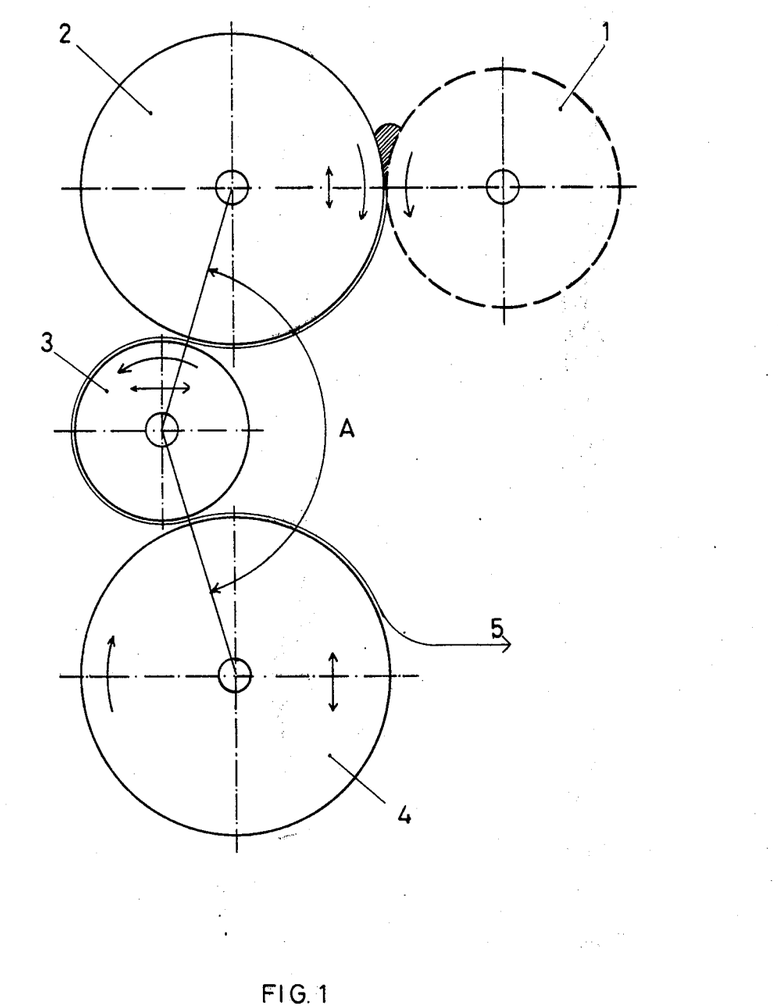
FIG. 1 is a somewhat schematic side elevation view of a calendar comprising four rolls.

FIG. 1 shows a calender for plastic foils comprising four rolls. The plastic material is fed into the nip between the first two rolls 1,2 from which the foil moves along the rolls 2,3 and 4 and along one part of their surfaces whereby the thickness of the foil decreases in the nips between these rolls and leaves the machine as a web 5. In the embodiment shown, the roll 3, or rolls 3 and 4, are crowned so that the calender produces an even foil web under certain predetermined working conditions under maximum load. When one or more of these conditions change, e.g. when the load on the nip between the rolls 3 and 4 decreases, the roll 3 is displaced horizontally so that the angle A is changed. Thereby a mutual adjustment of the force components acting on the bearings and the nips between the rolls is achieved, the nip component remaining constant and corresponding to the value which formed the basis for the calculations of the degree of crowning of the rolls. The bearings of the rolls 2 and 4, or possibly only one of these, are of course to be designed so as to allow a vertical movement of this or these rolls. The roll 3 may also be displaced along an arcuate line, e.g. along a path corresponding to the curvature of the roll 4. The displacement naturally always has to take place so that the axis of the roll 3 remains parallel to the other roll axes.

Figure 2:
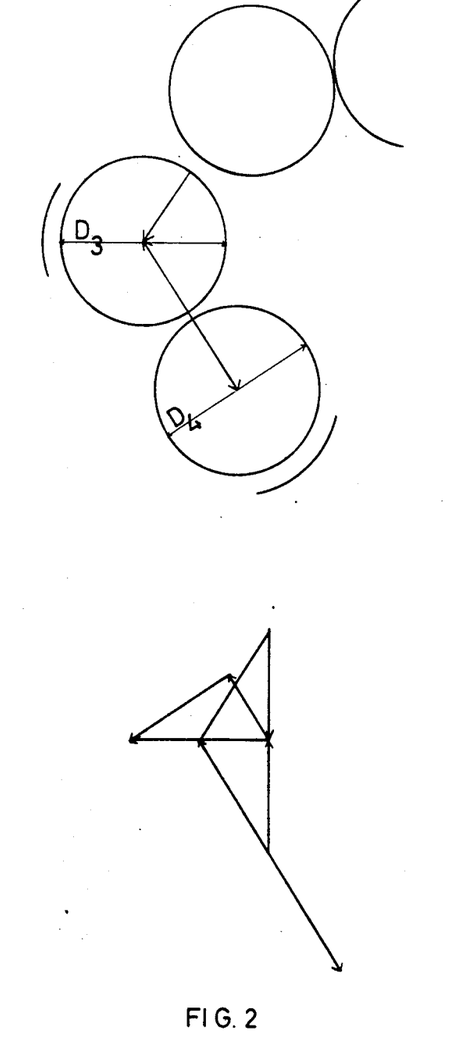
FIG. 2 diagrammatically illustrates the forces acting on the nips and the bearings and the direction and magnitude of these forces.

FIG. 2 demonstrates the forces acting on the nips and the bearings and also the direction and magnitude of these forces in a given position of the roll 3.

Figure 3:
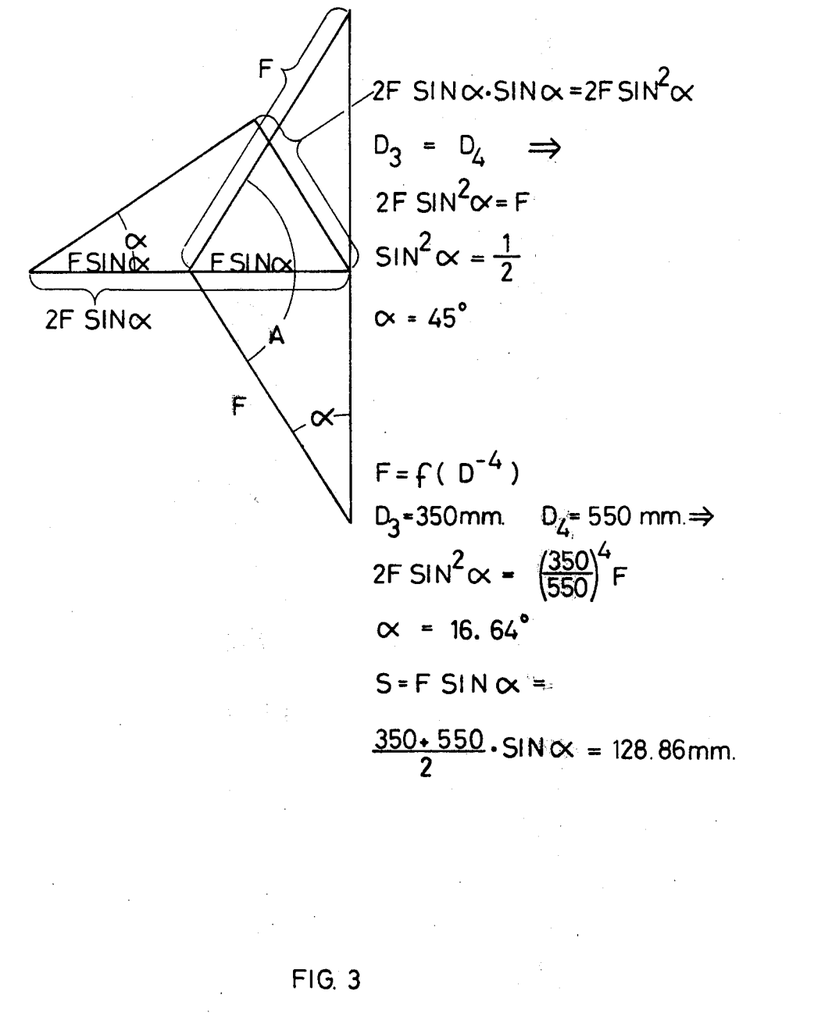
FIG. 3 is the force diagram showing the magnitude of the horizontal displacement of an adjustable roll compensating for half of the maximum load in a calendar where the last and the second-last rolls are of equal thickness.

FIG. 3 is a force diagram showing the magnitude of the horizontal displacement of the roll 3 which compensates for the half of the maximum load in a calender where the last and the second last rolls are of equal thickness, and in a case where the diameter of the last roll 4 is 550 mm and the diameter of the second last displacable roll is 350 mm. In the latter case, besides the angular displacement $\alpha$, also the horizontal displacement S has been calculated.

As is evident from FIGS. 2 and 3, the force $2 F \sin^2\alpha$ is the force acting on the nip between the rolls 3 and 4 and causing a deflection of the sideways displaced roll 3 in a direction away from the nip. Consequently this force component is the one which is adjusted by displacing the roll 3 so that the deflection in a direction outward from the nip of the displaced roll 3 compensates for the excess crowning of the roll 3 or 4, which excess crowning is a result of a decreased load on the calender.

Although the example shown concerns a calender where only one of the rolls is horizontally adjustable, it is of course possible to adapt the method so as to adjust two or more of the calender rolls in the suggested manner. By spreading the adjustment over several rolls, the individual limits for the respective displacements may be kept relatively narrow, it still being possible to achieve a total adjusting effect which covers a rather wide adjusting area, and as calenders comprise an integrated system of rolls under common load, it is evident that an achieved change in the deflection of one of the rolls leads to a change in the deflection also in the remaining rolls of the system.

Figure 4:
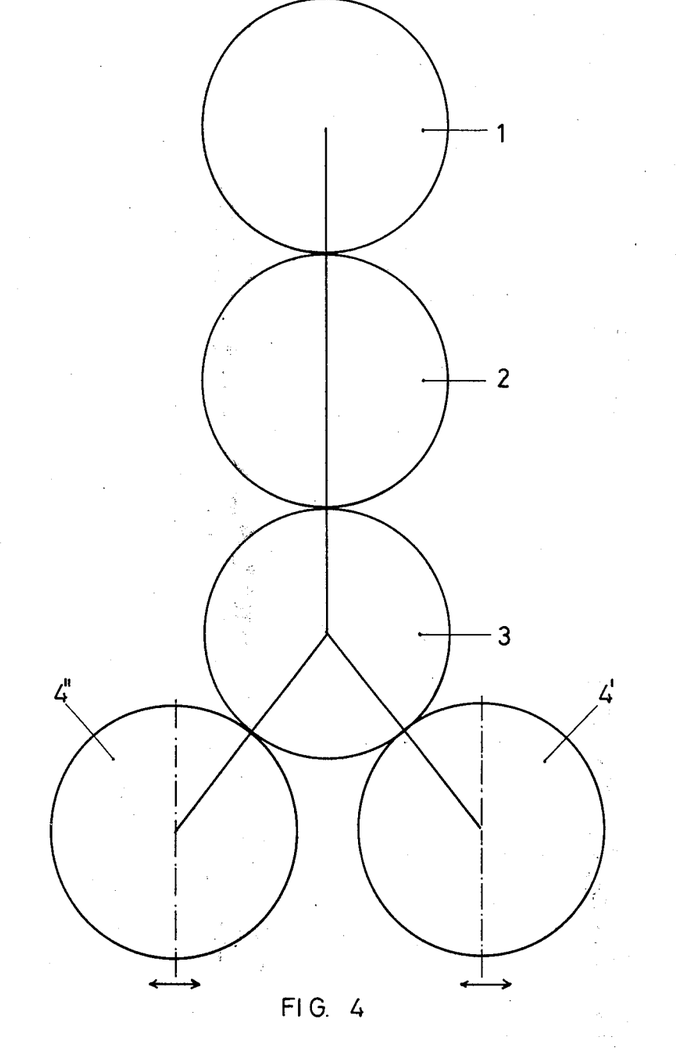
FIGS. 4, 5 and 6 are views, simmilar to FIG. 1, illustrating alternative embodiments of the invention method.
Figure 5:
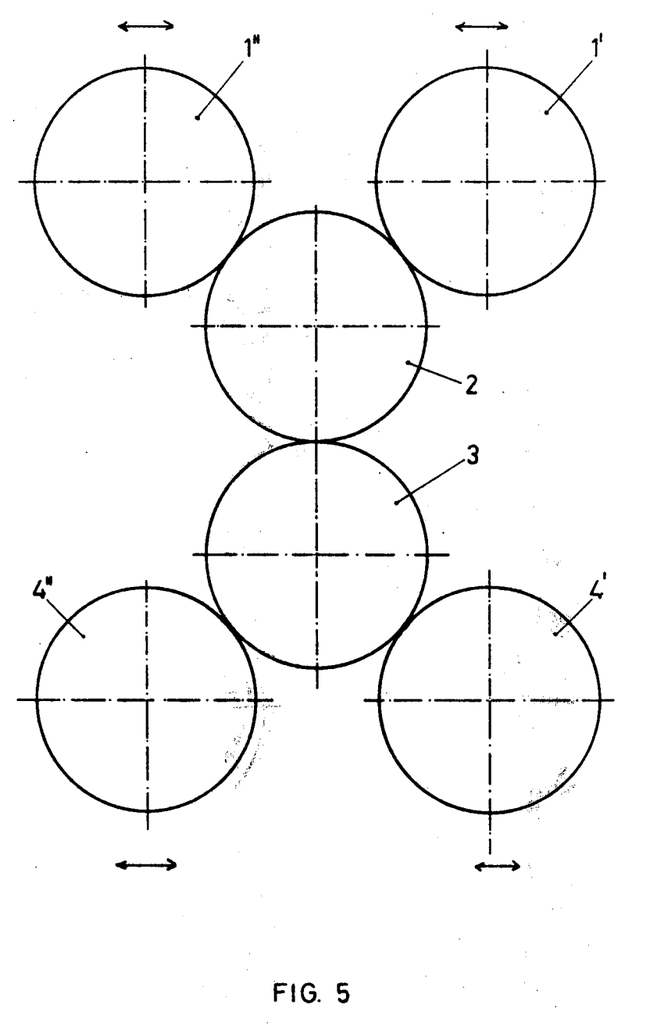
Figure 6:
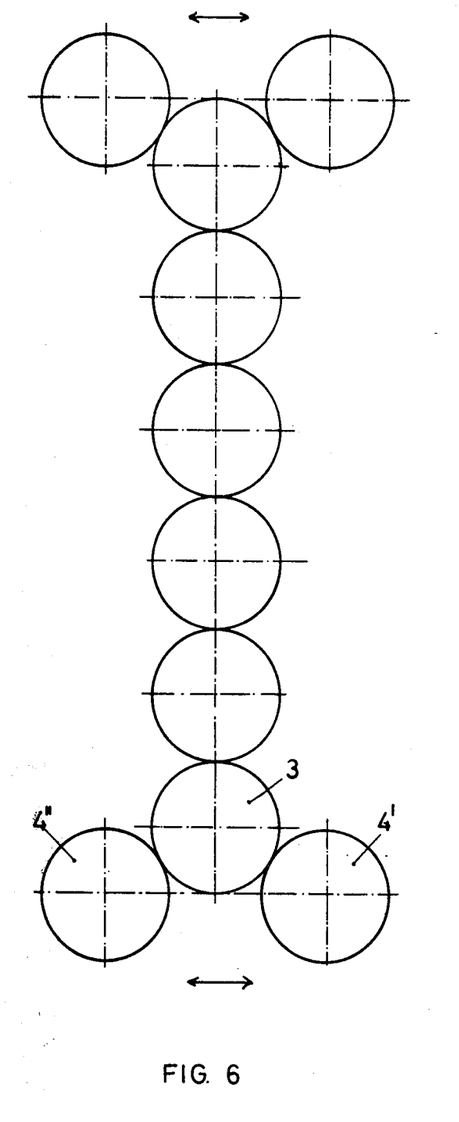

A further mode of the invention is shown in FIGS. 4 to 6. In this mode two rolls on the same level in the calender are displaced in pairs sideways, which rolls may be situated at one end of the calender or possibly at both ends of the calender. Also in this mode either the roll 3 or the rolls 4',4", or all the rolls 3,4',4", and in the mode of invention of FIG. 6 the corresponding rolls at one end of the calender are crowned. The roll or rolls are crowned in such a way that it results in a constant value transverse to the web in at least the last nip in the direction of web movement (for example between rolls 2 and 3) and corresponds to the maximum working load.

In case the load in the calender for some reason has to be decreased or decreases, for example when the foil to be manufactured is of the same thickness as before, but softer, the rolls 4',4" and, with these, also the roll 3 will not deflect according to the maximum load and consequently the roll 3 will be excessively crowned, i.e. too thick at the center, which results in that the foil undergoing treatment in the nip 3-2 will be thinner at the center compared to the borders. According to the invention the rolls 4',4" are then displaced in a direction away from each other in the horizontal plane, allowing space for the roll 3 to deflect downwardly, whereby the nip between the rolls 3 and 2 increases in size at the center as the roll 3 controllably deflects downwards to an extent corresponding to the excess crowning. A similar adjusting system may naturally be provided at both ends of the calender and the number of interposed rolls in the system may vary freely.

The method according to the invention has here been described in connection with the plastic industry, but it is evident that it equally well may be adapted i.a. in the paper industry and in the metal industry according to the embodiments shown, e.g. when manufacturing aluminium webs having a constant profile along the whole web width.

I claim:

1. A method for adjusting spacing, across the full width of a calendar stack, between at least rolls defining the last nip of a calendar stack having at least 3 rolls subjected to a common work-pressing load, less than a predetermined maximum value, axes of at least two of said rolls lying in a common plane, said method comprising: crowning at least one roll of said three.

2. A method, as claimed in claim 1, in which each crowned roll is displaced relative to such common plane.

3. A method, as claimed in claim 1, in which the rolls adjacent a crowned roll are displaced relative to such common plane.

4. A method as claimed in claim 1, in which each adjustable roll is displaced linearly.

5. A method, as claimed in claim 1, comprising crowning one of the rolls defining the last nip of the stack.

6. A method, as claimed in claim 1, in which each roll displaceable relative to such common plane is displaced based on one of such sensings and on calculations performed by a computer.

7. The method of claim 1, wherein the axis of each displeasable roll is displaced relative the common plane in an arcuate path.

8. A method as in claim 1 wherein each of the rolls displaceable relative the common plane is displaced in response to sensing thickness of the calendared web at least one point transversely of its width.

9. A method as in claim 1, wherein each of the rolls displaceable relative the common plane is displaced in response to sensing deflection of at least one roll of the stack.

10. A method as in claim 1, wherein each of the rolls displaceable relative the common plane is displaced in response to sensing the load of at least one roll of the stack.

* * * * *

UNITED STATES PATENT AND TRADEMARK OFFICE
CERTIFICATE OF CORRECTION

PATENT NO. : 4,117,054
DATED : September 26, 1978
INVENTOR(S) : Esko Salo

It is certified that error appears in the above-identified patent and that said Letters Patent are hereby corrected as shown below:

Claim 1, line 7, after "three" insert --rolls to correspond to said maximum work load for said stack; for work loads less than said maximum, correcting for excess crowning of said one roll, by displacing at least one of said rolls forming said nip relative said common plane in such a way as to initially change spacing between the crowned roll and a remaining two of said at least three rolls while maintaining parallel the axes of said at least three rolls, and moving said two rolls toward each other in said plane to compensate for said displacement of said one roll--.

Signed and Sealed this

Twenty-sixth Day of June 1979

[SEAL]

Attest:

RUTH C. MASON
Attesting Officer

DONALD W. BANNER
Commissioner of Patents and Trademarks